Sept. 1, 1970  C. F. AUMILLER  3,526,417
QUICK ACTING PIPE CONNECTOR
Filed April 16, 1968  2 Sheets-Sheet 1
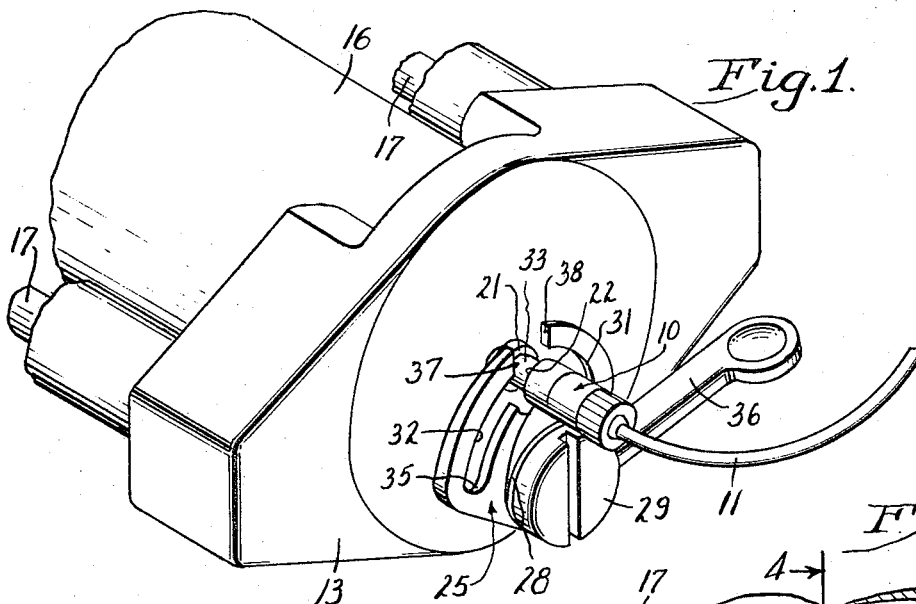
Fig.1.
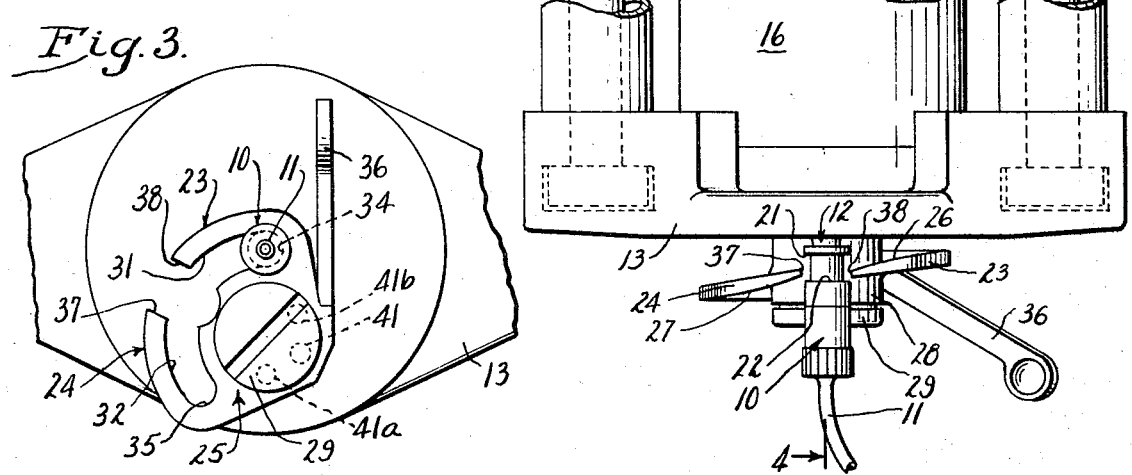
Fig.2.
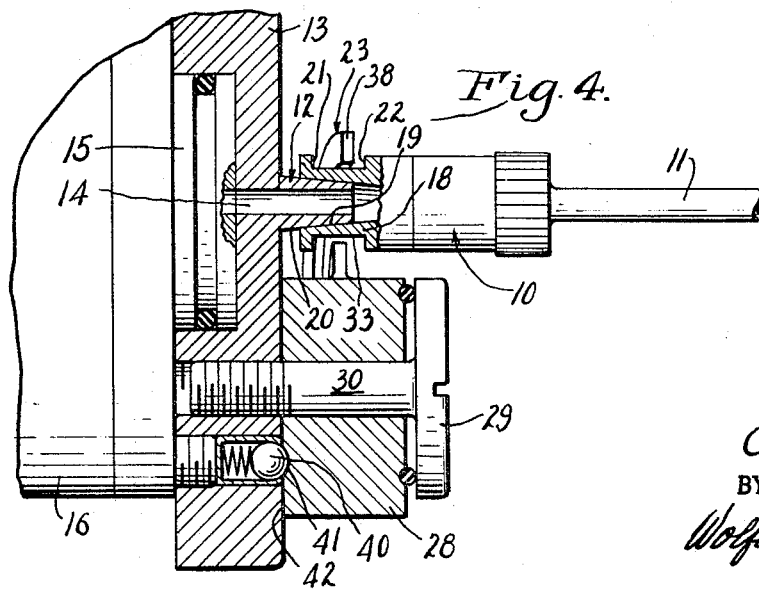
Fig.3.
Fig.4.
INVENTOR.
Clyde F. AuMiller
BY
Wolfe, Hubbard, Voit & Osann
ATTORNEYS

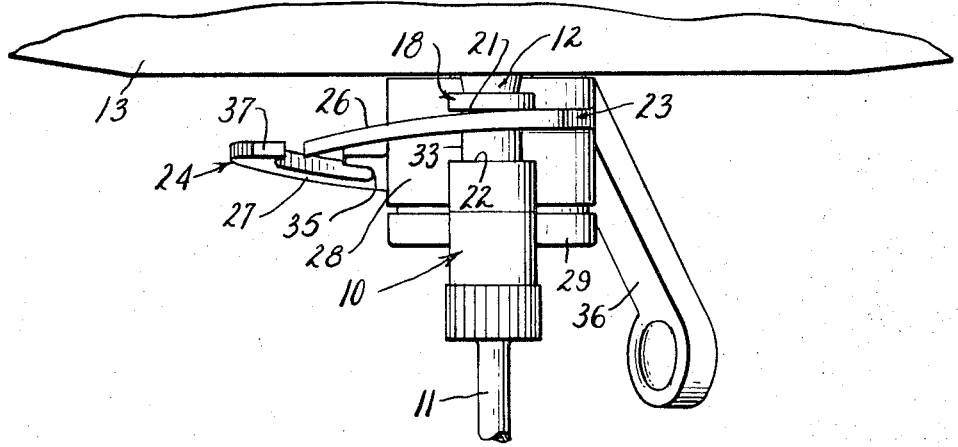
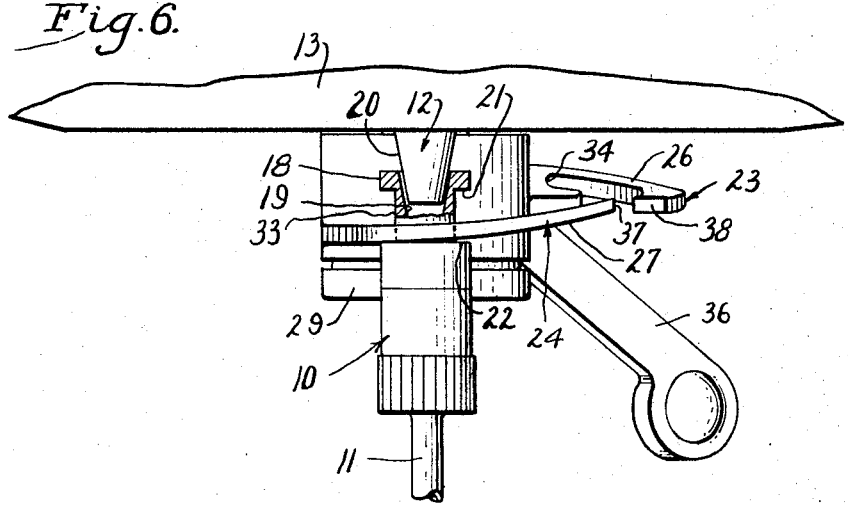

United States Patent Office 3,526,417
Patented Sept. 1, 1970

3,526,417
QUICK ACTING PIPE CONNECTOR
Clyde F. AuMiller, Rockford, Ill., assignor to Barber-Colman Company, Rockford, Ill., a corporation of Illinois
Filed Apr. 16, 1968, Ser. No. 721,837
Int. Cl. F16l 37/00
U.S. Cl. 285—38                                    10 Claims

ABSTRACT OF THE DISCLOSURE

Quick seating and disconnecting of frusto-conical mating surfaces on a tubular base and the end fitting on a pipe is effected by swinging a projecting hand lever through a center position (FIG. 2) to locking unlocking positions (FIGS. 5 and 6) in which arcuate inclined cams engage opposed axially spaced shoulders on the fitting and wedge the fitting to seated or released position. The fitting may be separated from the base when the lever is centered and the shoulders are freed from the cams.

BACKGROUND OF THE INVENTION

This invention relates to a quick acting pipe coupling of the type frequently used in medical equipment in which internal and external conical surfaces concentric with the pipe passage are seated and unseated by the application and release of forces exerted on axially spaced shoulders formed on a fitting secured to the end of the pipe. Heretofore, the actuating forces have been derived by opposite turning of a separately formed nut. In addition, connection and disconnection of the coupling parts requires both lateral and axial motion of the fitting and two-hand manipulation of the fitting and the nut.

SUMMARY OF THE INVENTION

The present invention overcomes the above and other disadvantages of such couplings by providing for seating and release of the fitting by inclined cams mounted on the base acting respectively on the axially spaced shoulders of the fitting by back and forth movements transversely of the coupling axis.

The invention also resides in the novel construction and pivotal mounting of the cams for movement in unison between opposite locking and unlocking positions disposed on opposite sides of a center position in which the low points of the cams are spaced apart angularly to permit axial retraction and replacement of the end fitting.

BRIEF DESCRIPTION OF THE DRAWINGS

FIG. 1 is a perspective view of a quick acting pipe coupling embodying the novel features of the present invention.

FIG. 2 is a plan view.

FIG. 3 is an end view but with the cam actuator in locked position.

FIG. 4 is a fragmentary section taken along the line 4—4 of FIG. 2.

FIGS. 5 and 6 are views similar to FIG. 2 but with the cams in seated and unseated positions.

DESCRIPTION OF THE PERFERRED EMBODIMENT

In the drawings, the invention is incorporated in a coupling for effecting quick connection and disconnection of a tubular fitting 10 on the end of a flexible pipe 11 with a projection 12 formed on a supporting base 13 and having a passage 14 leading to an end 15 of cylinder 16 against which the base is sealed and clamped as by bolts 17. One end of the fitting is telescoped on and secured to the pipe. The other end 18 is formed with an internal frusto-conical surface 19 of the same taper as and thus is adapted to telescope axially over and seat solidly around the correspondingly tapered external surface 20 on the projection 12. Externally, the end portion 18 of the fitting is formed with radially disposed and axially opposed annular shoulders 21, 22, spaced apart along the fitting and preferably disposed at opposite ends of the surface 19.

In accordance with the present invention, seating of the fitting as shown in FIG. 4 and unseated thereof (FIG. 6) is effected in the opposite movements transaxially of the pipe axis of angularly spaced cams 23 and 24 on an actuating member 25 which is mounted on the base 13 for movement transversely of the couping axis. In moving in opposite directions away from a center position (FIG. 2), inclined surfaces 26 and 27 of the cams engage the respective shoulders 21 and 22 and wedge the fitting 10 axially and seat and release the same as cams approach the positions shown in FIGS. 5 and 6.

Preferably, the transverse movement of the cams is achieved by a pivotal movement of the actuating member 25. For this purpose, the member 25 projects radially from a hub 28 disposed between the base 13 and the head 29 of a screw 30 threaded into the base 13 and forming the pivot for the member 25. The cams comprise angularly spaced arcuate arms concentric with the hub 28 and project angularly toward each other and cantilever fashion from member 25 so as to define angular slots 31, 32 opening toward each other and radially wider than the diameter 33 of the fitting between the shoulders 21, 22.

The closed ends 34 and 35 of the slots define stops for engaging the fitting surface 33 to limit the extent of swinging of the actuating member 25 and thus determine the seated (FIG. 4) and released (FIG. 6) positions of the actuating member. Back and forth swinging of the member 25 is facilitated by an arm 36 integral with and projecting outwardly from the hub 28.

The adjacent ends 37 and 38 of the cams are spaced apart angularly a distance greater than the diameter of the fitting 10. Thus, in the centered position (FIG. 2) of the member 25, the fitting 10 may be retracted off from the projection 12 and removed from the base and telescoped back onto the projection by straight axial shifting of the fitting.

In service operation and as a preliminary to coupling the fitting 10 to the base projection 12, the actuator arm 36 is placed in the center position (FIGS. 1 and 2) thus disposing the cam ends 37, 38 on opposite sides of and equidistant from the coupling axis. This position may be gaged readily by feeling the entry of a spring loaded detent ball 40 in a semi-spherical seat 41 in the opposed inner end face 42 of the hub 28. If desired, similar recesses 41a and 41b may be formed in the hub surface 42 to receive the ball 40 and indicate the disposal of the cams in the seating and released positions (FIGS. 5 and 6) of the actuating member 25.

With the actuating member 25 centered (FIG. 2), the fitting 10 may, by a straight axial movement, be inserted endwise between the cam ends 37, 38 and telescoped loosely onto the projection 12. Then, by swinging of the lever counter-clockwise and to the position shown in full in FIG. 3, the surface 26 of the cam 23 is moved circumferentially around the coupling axis in between the fitting shoulders 21 and 22 and into engagement with the shoulder 21 across at one side thereof. The fitting is thus wedged endwise along the projection 12 and becomes fully seated thereon and locked (FIG. 5) when the member reaches the position shown in FIG. 3.

To utilize the cam surface 27 in effecting easy release of the fitting 10, the hand lever is swung reversely, that is, counterclockwise from the coupled position (FIG. 3), through the center position (FIG. 2) and then on to the unlocking position (FIG. 6). In approaching the latter, the cam surface 27 engages the shoulder 22 and wedges the fitting outwardly along the projection 12 thus releasing the fitting from the projection 12.

To permit the release fitting to be withdrawn and separated from base 13, the hand lever is again swung clockwise but stopped in the center position shown in FIG. 2. Such stopping is sensed by entry of the detent ball 40 into the recess 41 as shown in FIG. 4. In this position of the actuating member 25, the release fitting may be retracted axially and outwardly between the cam ends 37, 38. The pipe and fitting thus separated from the base may be recoupled to the same base 13 or alternatively to the similar base of other apparatus.

I claim:

1. A pipe coupling comprising a base defining a passage and having a frusto-conical surface concentric with the passage, a tubular fitting having a similarly tapered and mating surface adapted to telescope with said first surface and seat tightly on and around the same, opposed axially facing shoulders spaced along and extending transversely of the exterior of said fitting, an actuating member mounted on said base for movement transversely of the fitting back and forth between spaced locking and unlocking positions through a center position, and first and second inclined cams rigid with and spaced along said member and respectively movable therewith across said fitting between said shoulders as the member is moved in opposite directions away from said center position, said first cam engaging one of said shoulders and acting to wedge the fitting axially as the member is moved from said center position to said locking position and force the tapered surfaces together in tight seating relation, said second cam similarly engaging the other of said shoulders and acting during movement of the member from said center position to said unlocking position to wedge said fitting in the opposite direction and thereby release the same from said first surface, said shoulders, when said member is in said center position, being free of said cams whereby to permit axial withdrawal of said fitting from said base.

2. A pipe coupling as defined in claim 1 in which said first conical surface is on the exterior of a projection rigid with said base and said shoulders are disposed at opposite ends of said projection surface.

3. A pipe coupling as defined in claim 2 in which said actuating member is mounted on said base to swing about an axis paralleling and spaced laterally from the telescoping surfaces.

4. A pipe coupling as defined in claim 3 in which said cams have surfaces that slope angularly around the fulcrum of said member with the low points of the wedges angularly spaced apart to define said center position of the member.

5. A pipe coupling as defined in claim 4 in which the seated and released positions of said member are defined by oppositely facing stop surfaces on said base engageable with opposed and angularly spaced surfaces on said member.

6. A pipe coupling as defined in claim 3 including an arm on said member projecting outwardly from the fulcrum thereof to facilitate manual back and forth swinging of the member.

7. A pipe coupling as defined in claim 6 including detent surfaces on said base and member interengageable with each other to define the center position of said member.

8. A pipe coupling comprising a base defining a passage and having a frusto-conical surface concentric with the passage, a tubular fitting having a similarly tapered and mating surface adapted to telescope with said first surface and seat tightly on and around the same, external circumferentially extending shoulder on the exterior of said fitting facing axially in the direction of convergences of said surface, and actuating member mounted on said base for pivotal movement transversely of the coupling axis and back and forth between first and second positions about an axis extending along and offset laterally from the coupling axis, an inclined cam on said member engaging a segment of said shoulder during movement of the member from said first to said second position to wedge the fitting axially and seat the same on said conical surface, said fitting, when said member is in said first position, being free of said cam whereby to permit axial withdrawal of the fitting off from and telescoping of the same back onto said tube surface.

9. A pipe coupling as defined in claim 8 including detent elements engageable with each other when said member is in said first position.

10. A pipe coupling comprising a base defining a passage and having a frusto-conical surface concentric with the passage, a fitting having a similarly tapered and mating surface adapted to telescope with said first surface and seat tightly on and around the same, opposed axially spaced shoulders spaced along and extending circumferentially around the exterior of said fitting, an actuating member mounted on said base to swing back and forth about an axis extending along and spaced laterally from the coupling axis between spaced locking and unlocking positions through a center position, and first second cams on said member angularly spaced about said axis and movable in unison with the member and across said fitting between said shoulders as the member is moved in opposite directions away from said center position, said first cam engaging a segment of one of said shoulders to wedge the fitting onto said base surface as the member is moved to said locking position, said second cam similarly engaging a segment of the other of said shoulders and acting during movement of the member to said unlocking position to wedge the fitting outwardly to release the same from said base surface, said shoulders, when said member is in said center position, being free of said cams whereby to permit axial withdrawal of the fitting off from and telescoping of the same back onto said tube surface.

References Cited

UNITED STATES PATENTS

| 640,595 | 1/1900 | Stadtmuller | 285—38 |
| 747,633 | 12/1903 | Pellington | 285—38 |
| 790,685 | 5/1905 | Hendricks | 285—38 |
| 2,324,792 | 7/1943 | Meyer | 285—38 |

FOREIGN PATENTS 1,027,021   3/1958   Germany.

THOMAS F. CALLAGHAN, Primary Examiner

U.S. Cl. X.R.

285—93, 332, 310